United States Patent
Burry et al.

(10) Patent No.: US 8,934,676 B2
(45) Date of Patent: Jan. 13, 2015

(54) ROBUST CHARACTER SEGMENTATION FOR LICENSE PLATE IMAGES

(75) Inventors: Aaron Michael Burry, Ontario, NY (US); Claude Fillion, Rochester, NY (US); Vladimir Kozitsky, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 277 days.

(21) Appl. No.: 13/539,739

(22) Filed: Jul. 2, 2012

(65) Prior Publication Data

US 2013/0294654 A1 Nov. 7, 2013

Related U.S. Application Data

(60) Provisional application No. 61/642,929, filed on May 4, 2012.

(51) Int. Cl.
| | |
|---|---|
| G06K 9/00 | (2006.01) |
| G06K 9/48 | (2006.01) |
| G06K 9/03 | (2006.01) |
| G06K 7/10 | (2006.01) |

(52) U.S. Cl.
USPC ............ 382/105; 382/200; 382/310; 382/321

(58) Field of Classification Search
None
See application file for complete search history.

(56) References Cited

U.S. PATENT DOCUMENTS

| | | | |
|---|---|---|---|
| 4,817,166 A * | 3/1989 | Gonzalez et al. ............. 382/105 |
| 6,473,517 B1 | 10/2002 | Tyan et al. | |
| 6,553,131 B1 * | 4/2003 | Neubauer et al. ............. 382/105 |
| 2005/0084134 A1 | 4/2005 | Toda | |
| 2006/0098899 A1 * | 5/2006 | King et al. .................... 382/305 |
| 2008/0212837 A1 | 9/2008 | Matsumoto et al. | |
| 2009/0208060 A1 | 8/2009 | Wang et al. | |
| 2011/0228085 A1 | 9/2011 | Hofman | |

OTHER PUBLICATIONS

Jia, Xiaodan et. al. "A Novel Algorithm for Character Segmentation of Degraded License Plate Based on Prior Knowledge," Proceedings of the IEEE International Conference on Automation and Logistics, Aug. 18, 2007, 5 pages.*
Coetzee, Charl et. al., "PC Based Number Plate Recognition System," Proceedings IEEE International Symposium on Industrial Electronics, Jul. 7, 1998, 7 pages.*
U.S. Appl. No. 13/448,976, filed Apr. 17, 2012, Burry et al.
U.S. Appl. No. 13/453,144, filed Apr. 23, 2012, Burry et al.

(Continued)

*Primary Examiner* — Jason M Repko
*Assistant Examiner* — Ryan P Potts
(74) *Attorney, Agent, or Firm* — Luis M. Ortiz; Kermit D. Lopez; Ortiz & Lopez, PLLC (57) ABSTRACT

A method and system for achieving accurate segmentation of characters with respect to a license plate image within a tight bounding box image. A vehicle image can be captured by an image capturing unit and processed utilizing an ALPR unit. A vertical projection histogram can be calculated to produce an initial character boundary (cuts) and local statistical information can be employed to split a large cut and insert a missing character. The cut can be classified as a valid and/or a suspect character and the suspect character can be analyzed. The suspect character can be normalized and passed to an OCR module for decoding and generating a confidence quote with every conclusion. The non-character images can be rejected at the OCR level by enforcing a confidence threshold. An adjoining suspect narrow character can be combined and the OCR confidence of the combined character can be assessed.

15 Claims, 11 Drawing Sheets

(56) References Cited

OTHER PUBLICATIONS

Anagnostopoulos, C.-N. E. et al., "License Plate Recognition from Still Images and Video Sequences: A Survey," IEEE Transactions on Intelligent Transportation Systems (2008) 9(3):377-391.

Bressan, M., Lessons and Perspectives after a Year of ACS/XIG Partnership, Xerox Research Centre Europe, no date, 15 pages.

Casey, R. G. et al., "A Survey of Methods and Strategies in Character Segmentation," IEEE Transactions on Pattern Analysis and Machine Intelligence (1996) 18(7):690-706.

Jia, W. et al., "Segmenting Characters from License Plate Images with Little Prior Knowledge," 2010 Digital Image Computing: Techniques and Applications (2010) pp. 220-226.

* cited by examiner

ROBUST CHARACTER SEGMENTATION FOR LICENSE PLATE IMAGES

CROSS-REFERENCE TO PROVISIONAL APPLICATION

This patent application claims the benefit under 35 U.S.C. §119(e) of U.S. Provisional Application Ser. No. 61/642,929 entitled "Robust Character Segmentation for License Plate Images," which was filed on May 4, 2012 and is incorporated herein by reference in its entirety.

TECHNICAL FIELD

Embodiments are generally related to data-processing systems. Embodiments are also related to ALPR (Automatic License Plate Recognition) techniques, methods, and systems. Embodiments are additionally related to image-processing methods and systems. Embodiments are further related to character segmentation of license plate images.

BACKGROUND OF THE INVENTION

ALPR (Automatic License Plate Recognition) systems often function as the core module of "intelligent" transportation infrastructure applications. License plate recognition can be employed to identify a vehicle by automatically reading a license plate utilizing image-processing and character recognition technology. A license plate recognition operation can be performed by locating the license plate in an image, segmenting the characters in the plate, and performing an OCR (Optical Character Recognition) operation with respect to the characters identified. In order for OCR to achieve high accuracy, it is necessary to obtain properly segmented characters.

The license plate images captured under a realistic condition (i.e., field deployed solutions) include a number of noise sources such as, for example, heavy shadows, non-uniform illumination (e.g., from one vehicle to next, daytime versus nighttime, etc.), challenging optical geometries (e.g., tilt, shear, or projective distortions), plate frames and/or stickers partially touching characters, partial occlusion of characters (e.g., trailer hitch ball), poor contrast, and general image noise (e.g., salt and pepper noise). Additionally, variations between states in character font, width, and spacing further add difficulty with respect to proper character segmentation.

Several approaches have been implemented for performing character segmentation on license plate images. One approach involves the use of a priori knowledge such as, for example, character spacing. The presence of plates from multiple states, each having different character fonts and spacing, however, preclude the usage of such priori information. Other segmentation approaches rely only on data within the image, but assume fixed pitch character spacing. Such approaches are suitable for printing applications, but not for the ALPR systems, which can have non-uniformly spaced characters, for example, a state logo or special designation (e.g., wheelchair symbol to indicate a handicap license plate).

Based on the foregoing, it is believed that a need exists for an improved character segmentation method and system for a license plate image. The embodiment to be described in greater detail herein utilizes a two-stage approach; the first stage utilizing a vertical projection histogram, the second stage applying additional analysis such as OCR and application of state-specific rules to suspect character segments produced by the first stage.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved ALPR (Automatic License Plate Recognition) method and system.

It is another aspect of the disclosed embodiments to provide for improved character segmentation for license plate images.

It is a further aspect of the disclosed embodiments to provide for an improved vertical projection histogram for efficiently achieving accurate and enhanced segmentation of characters.

It is an additional aspect of the disclosed embodiments to provide for the use of OCR in a second stage to improve performance.

The aforementioned aspects and other objectives and advantages can now be achieved as described herein. A method and system for achieving accurate segmentation of characters with respect to a license plate image within a tight bounding box image is disclosed herein. A vehicle image can be captured by an image capturing unit and processed utilizing an ALPR (Automatic License Plate Recognition) unit. A vertical projection histogram can be calculated to produce an initial character boundary (cuts) and local statistical information (e.g., median character spacing) can be employed to split a large cut and insert a missing character. The cut can then be classified as a valid character and/or a suspect character and the suspect character can be analyzed and a robust performance over a variety of state logos, fonts, and character spacing can be enabled. The suspect character can then be normalized and passed to an OCR (Optical Character Recognition) subsystem for decoding and generating a confidence quote with every conclusion. The non-character images can be rejected at the OCR level by enforcing a confidence threshold. An adjoining suspect narrow character can be combined and the OCR confidence of the combined character can be assessed. The first stage of the segmentation process requires minimal computational resources and consequently applied to each input image to achieve good character segmentation accuracy. The second stage of this segmentation process need only be applied to characters deemed suspect by the first stage.

The vertical projection histogram from a binarized image can be computed. A midpoint of a segment along the vertical projection histogram having a value at or below the threshold can be found. The midpoint can be employed as an initial character segmentation boundary (raw blocks) and an "invalid" raw blocks (i.e., an "invalid" block may have too few or too many pixels; blocks that are too narrow can be considered "valid" characters) can be removed. The location of a maximum histogram value and a beginning and endpoint for each of the remaining revised blocks can be determined and a median spacing between the revised block midpoints can be measured. A wide block can be split and a gap between the blocks can be converted into an eligible block. The validity of characters can be checked and flagged if suspect. A single, wide cut can be split into two by placing a boundary at a minimum histogram value in a region near the center of the wide cut. The large gap caused by omission of a special character can be replaced with a missing image data. Finally, an image-based classifier can be trained to identify presence (or absence) of a valid letter or number and can be applied to each of the segmented cuts.

One or more segmentation errors can be identified and addressed. The character images and corresponding labels from the segmentation process can be received and the images can be identified utilizing a label as either likely characters (0) or not (1). A copy of input character label array (inlabel) can be created as outlabel and all values of the outlabel can be initialized to zero. Each element in the outlabel can be set to 1 for a character identified as non-character that are also touching boundaries until a valid character is encountered. The outlabel elements can be assigned to 2 for each non-characters surrounded by the valid characters. The outlabel elements can then be assigned to 3 for each set of two non-characters surrounded by the valid characters. The two images can be combined and copied to first location for each set of elements in the outlabel set to 3 and also set outlabel for second location back to 1.

Each character image labeled as 0, 2, or 3 can be run through the OCR for obtaining OCR ID and confidence. The OCR confidence can be compared to the threshold for each image labeled as 3, if greater, change in label from 1 to 3 and output OCR ID as part of the code. The lowest confidence neighbor for each image labeled as 2 can be selected, two images can be merged and passed to the OCR subsystem to obtain the ID and confidence for the merged image. The label from 1 to 4 can be changed and the output merged ID as part of code, if confidence of the merged image is greater than the threshold and greater than the confidence of character labeled as 2 and greater than its neighbor. The confidence of character labeled as 2 to the threshold can be compared if the merged image confidence does not meet requirements, and pass ID as part of the code if met. Such segmentation process provides a net benefit while minimizing errors and false alarms. The character segmentation can be performed utilizing the vertical projection histogram, without prior information and is largely robust to the variation in character spacing caused by the state logo and a specialty designation.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein: rather, these embodiments are provided so that this disclosure will be thorough and complete and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the present invention can be embodied as a method, data-processing system, or computer program product. Accordingly, the present invention may take the form of an entire hardware embodiment, an entire software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB flash drives, DVDs, CD-ROMs, optical storage devices, magnetic storage devices, etc.

Computer program code for carrying out operations of the present invention may be written in an object oriented programming language (e.g., JAVA, C++, etc.). The computer program code, however, for carrying out operations of the present invention may also be written in conventional procedural programming languages such as the "C" programming language or in a visually oriented programming environment such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, WiMax, 802.11x, and cellular network or the connection can be made to an external computer via most third party supported networks (e.g. through the Internet via an internet service provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data-processing apparatus to produce a machine such that the instructions, which execute via the processor of the computer or other programmable data-processing apparatus, create means for implementing the functions/acts specified in the block or blocks.

These computer program instructions may also be stored in a computer-readable memory that can direct a computer or other programmable data-processing apparatus to function in a particular manner such that the instructions stored in the computer-readable memory produce an article of manufacture including instruction means which implement the function/act specified in the block or blocks.

The computer program instructions may also be loaded onto a computer or other programmable data-processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 1:
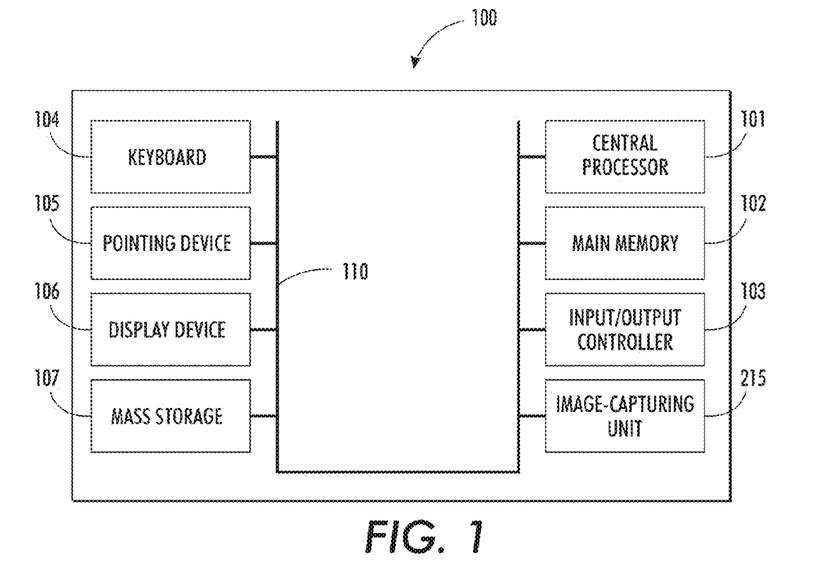
FIG. 1 illustrates a schematic view of a computer system, in accordance with the disclosed embodiments.
Figure 2:
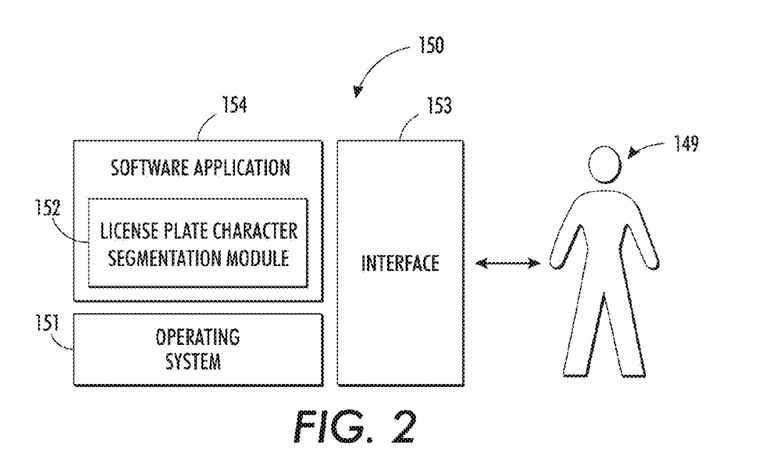
FIG. 2 illustrates a schematic view of a software system including a license plate character segmentation module, an operating system, and a user interface, in accordance with the disclosed embodiments.

FIGS. 1-2 are provided as exemplary diagrams of data-processing environments in which embodiments of the present invention may be implemented. It should be appreciated that FIGS. 1-2 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 1, the disclosed embodiments may be implemented in the context of a data-processing system 100 that includes, for example, a central processor 101, a main memory 102, an input/output controller 103, and an image-capturing unit 215 (e.g., a digital camera, video camera, etc.). System 100 can also include a keyboard 104, an input device 105 (e.g., a pointing device such as a mouse, track ball, pen device, etc.), a display device 106, and a mass storage 107 (e.g., a hard disk). System 100 can also include, for example, a USB (universal serial bus) and/or other types of peripheral connections. As illustrated, the various components of data-processing system 100 can communicate electronically through a system bus 110 or similar architecture. The system bus 110 may be, for example, a subsystem that transfers data between, for example, computer components within data-processing system 100 or to and from other data-processing devices, components, computers, etc.

FIG. 2 illustrates a computer software system 150 for directing the operation of the data-processing system 100 depicted in FIG. 1. Software application 154, stored in main memory 102 and on mass storage 107, generally includes a kernel or operating system 151 and a shell or interface 153. One or more application programs, such as software application 154, may be "loaded" (i.e., transferred from mass storage 107 into the main memory 102) for execution by the data-processing system 100. The data-processing system 100 receives user commands and data through user interface 153; these inputs may then be acted upon by the data-processing system 100 in accordance with instructions from operating system module 151 and/or software application 154.

The following discussion is intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 153, which is preferably a graphical user interface (GUI), can serve to display results, whereupon a user may supply additional inputs or terminate a particular session. In some embodiments, operating system 151 and interface 153 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 151 and interface 153. The software application 154 can include, for example, a license plate character segmentation module 152 for achieving accurate segmentation of characters of a license plate image within a tight bounding box image. The license plate character segmentation module 152 can include instructions such as those of methods 300, 450, 700 and 800 discussed herein with respect to FIGS. 4, 6, 14 and 15.

FIGS. 1-2 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms including Macintosh, Unix, Linux, and the like.

Figure 3:
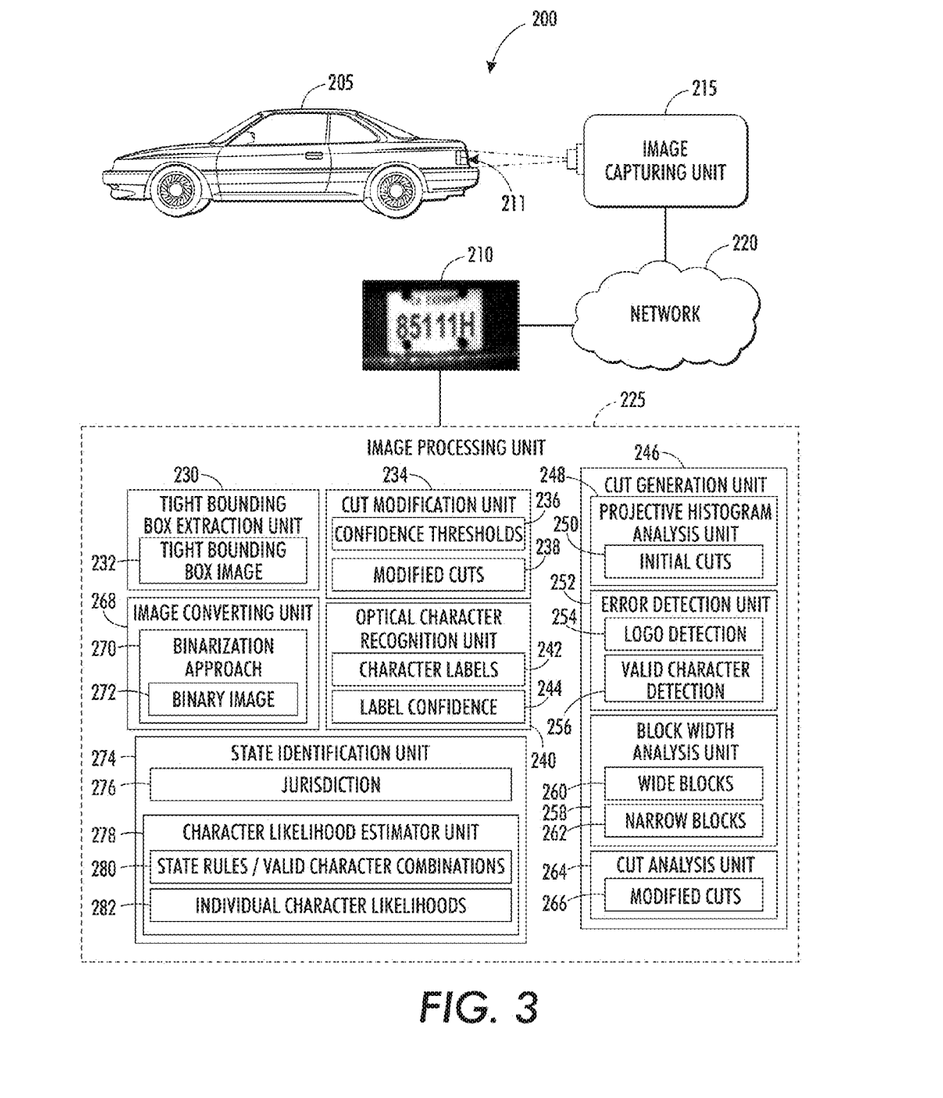
FIG. 3 illustrates a block diagram of a license plate character segmentation system, in accordance with the disclosed embodiments.

FIG. 3 illustrates a block diagram of a license plate character segmentation system 200, in accordance with the disclosed embodiments. Note that in FIGS. 1-16, identical or similar blocks are generally indicated by identical reference numerals. The system enhances the performance of automated license plate recognition (ALPR), which is a special form of optical character recognition (OCR). License plate recognition is a type of technology, mainly software, that enables a computer system to read automatically a registration number (license number) of vehicles from a digital picture. Reading automatically the registration number means transforming the pixels of a digital image into an ASCII text of a number plate.

The license plate recognition system generally includes an image capturing unit 215 (e.g., camera) for capturing an image of a vehicle 205 within an effective field of view. The image capturing unit 215 can be operatively connected to an image-processing unit 225 (e.g., an ALPR unit) via a network 220. Note that the image capturing unit 215 described in greater detail herein is analogous or similar to the image capturing unit 215 of the data-processing system 100, depicted in FIG. 1. The image-capturing unit 215 may include built-in integrated functions such as image-processing, data formatting, and data compression functions. Also, the unit 215 can have imager-positioning and range-finding capabilities and a flash bulb.

Note that the network 220 may employ any network topology, transmission medium, or network protocol. The network 220 may include connections such as wire, wireless communication links, or fiber optic cables. Network 220 can also be an Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages.

The image capturing unit 215 can communicate with the image-processing unit 225 to continuously monitor traffic within an effective field of view. The image-processing unit 225 can receive a captured image from the image capturing unit 215 in order to process the image (or a group of images). The image-processing unit 225 is preferably a small, hand-held computer device or palmtop computer as depicted in FIG. 1 that provides portability and is adapted for easy mounting. The image-capturing unit 215 can capture multiple images (e.g., front and rear license plate images) as the vehicle 205 passes through an observation zone. The image-processing unit 225 can process each image.

The image-processing unit 225 generally can include a number of components, which can be implemented in the context of, for example, software modules and/or hardware modules, depending upon design considerations. The image-processing unit generally includes a tight bounding box extraction module or unit 230. Such a module 230 includes a tight bonding box image 232. The image-processing unit 225 can also include a cut modification module or unit 234, which generally includes data indicative of confidence thresholds 236 and modified cuts 238. The image-processing unit 225 can also include an OCR (Optical Character Recognition) module or unit 240, which includes character labels 242 and label confidences 244.

In addition, the image-processing unit 225 can include a cut generation module or unit 246, which can include a projective histogram analysis module or unit 248. The module 248 can include a module 250 for generating or accomplishing initial cuts. The cut generation unit 246 can further include an error detection unit 252, which can include a module 254 for logo detection and a module 256 for valid character detection. The cut generation unit 246 can further include a block width analysis module or unit 258, which can generate wide blocks 260 or narrow blocks 262. Finally, the cut generation unit 246 can include a cut analysis module or unit 264, which can generate modified cuts 266.

The image-processing unit 225 can further include an image converting module or unit 268, which in turn can include a module for accomplishing a binarization approach 270 with respect to a binary image 272. The image-processing unit 225 can further include a state identification unit 274, which includes jurisdiction module 276 and a character likelihood estimator module or unit 278. The module/unit 278 can include a module 280 for generating/calculating state rules/valid character combinations and a module 282 for calculating/determining individual character likelihoods.

Figure 4:
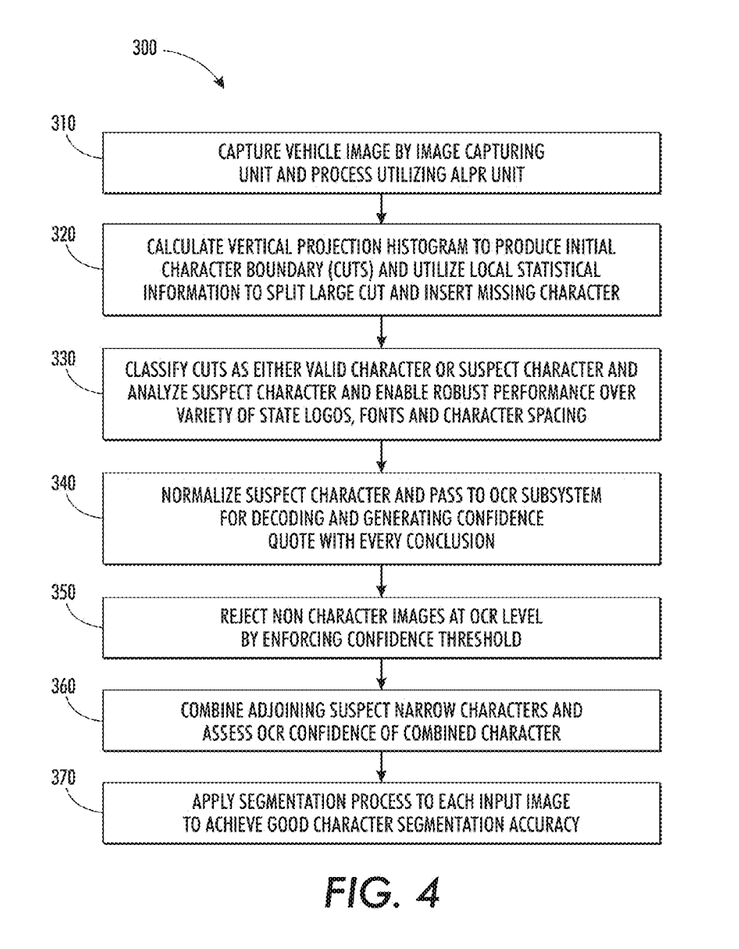
FIG. 4 illustrates a high level flow chart of operations illustrating logical operational steps of a method for achieving accurate segmentation of characters of a license plate image within a tight bounding box image, in accordance with the disclosed embodiments.

FIG. 4 illustrates a high level flow chart of operations illustrating logical operational steps of a method 300 for achieving accurate segmentation of characters of license plate images within, for example, the tight bounding box image 232, in accordance with the disclosed embodiments. Initially, the vehicle image can be captured via the image capturing unit 215 and processed utilizing image-processing unit 225, as indicated at block 310. A vertical projection histogram can be calculated to produce the initial character boundary (cuts) and local statistical information (e.g., median character spacing) can be employed to split a large cut and insert a missing character, as depicted at block 320. Thereafter, as shown at block 330, the cuts can then be classified as either a valid character or a suspect character. The suspect character can be analyzed and a robust performance over a variety of state logos, fonts, and character spacing can be enabled.

The suspect character can then be normalized and passed to, for example, an OCR subsystem (e.g., OCR module 240 shown in FIG. 3) for decoding and generating a confidence quote (e.g., see confidence thresholds 236 in FIG. 3) with every conclusion, as illustrated at block 340. Next, as shown at block 350, non-character images can be rejected at the OCR level by enforcing the confidence threshold (i.e., see block 236 in FIG. 3). Adjoining suspect narrow characters can be combined and the OCR confidence of the combined character assessed, as indicated at block 360. The segmentation process requires minimal computational resources and consequently applied to each input image to achieve good character segmentation accuracy, as depicted at block 370.

Figure 5:
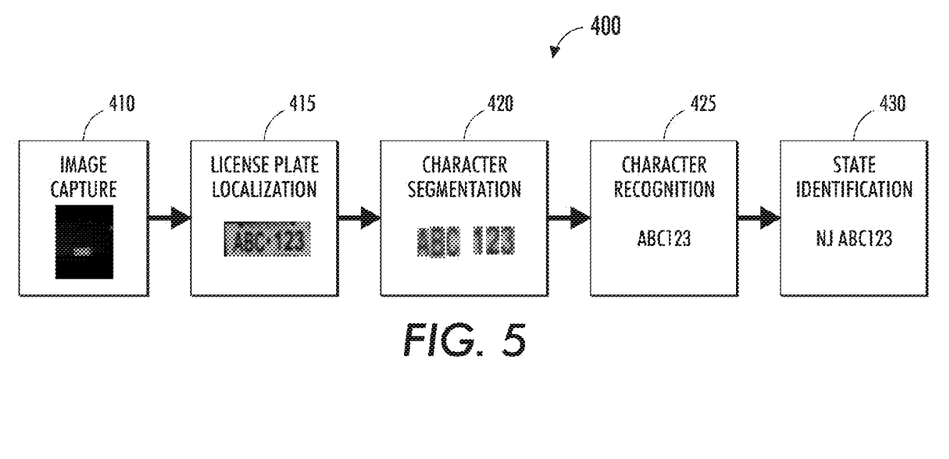
FIG. 5 illustrates a block diagram of an automatic license plate recognition system, in accordance with the disclosed embodiments.

FIG. 5 illustrates a block diagram of an automatic license plate recognition system 400, in accordance with the disclosed embodiments. The localization of license plate 210 in the captured image can be performed, as indicated at blocks 410 and 415. Next, the license plate characters can be segmented, as shown at block 420. The character can be recognized and the state id can be employed for confidence evaluation, as indicated at blocks 425 and 430.

Figure 6:
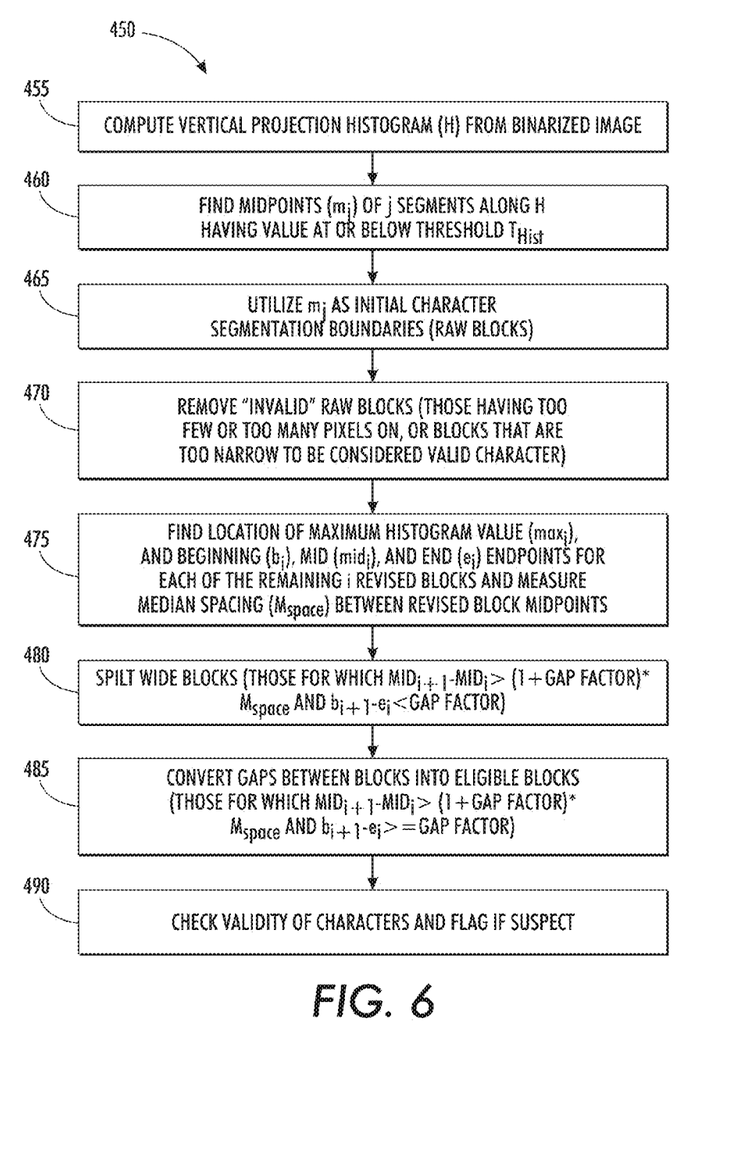
FIG. 6 illustrates a high level flow chart of operations illustrating logical operational steps of a method for segmenting license plate characters, in accordance with the disclosed embodiments.
Figure 7:
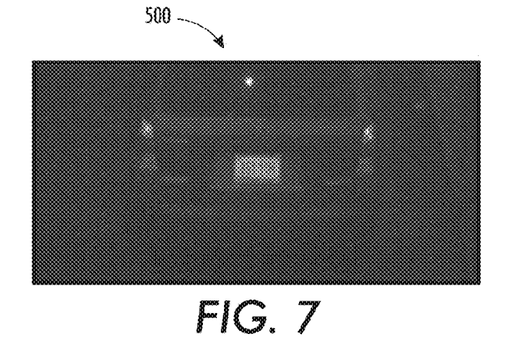
FIGS. 7-9 illustrate an exemplary view of an intermediate image result, in accordance with the disclosed embodiments.
Figure 8:
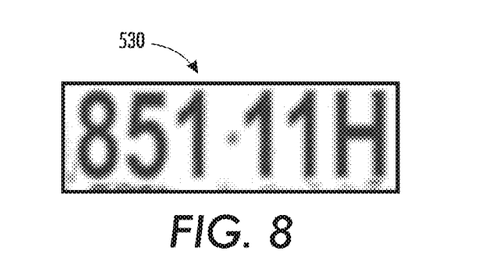
Figure 9:
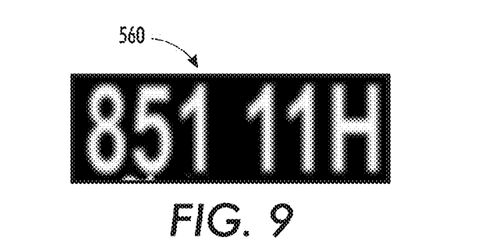
Figure 10:
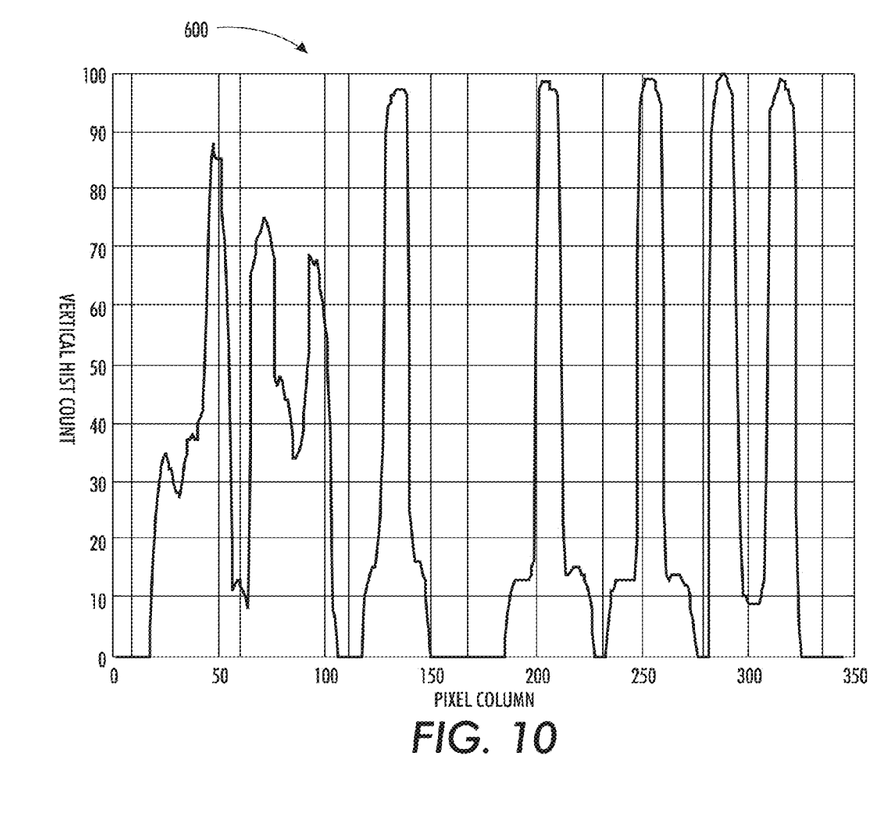
FIG. 10 illustrates a graph depicting vertical projection histogram for the image in FIG. 7, in accordance with the disclosed embodiments.

FIG. 6 illustrates a high level flow chart of operations illustrating logical operational steps of a method 450 for segmenting license plate characters, in accordance with the disclosed embodiments. Initially, as indicated at block 455, the vertical projection histogram (H) from binarized image can be computed. Note that the vertical projection histogram of the image can be employed to obtain the vertical shape factors. FIG. 7 illustrates an original license plate image 500 and FIGS. 8-9 illustrate the tight bounding box 530 and 560 generated before and after binarization. FIG. 10 illustrates the vertical projection histogram 600 with approximate letter location.

Figure 11:
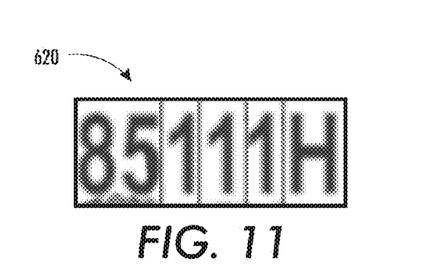
FIGS. 11-13 illustrate an exemplary view of vertical character segmentation results utilizing the character segmentation method depicted in FIG. 6, in accordance with the disclosed embodiments.

The midpoints ($m_j$) of j segments along H having value at or below threshold $T_{Hist}$ can be found, as shown at block 460. The $m_j$ can be employed as initial character segmentation boundaries (raw blocks) and "invalid" raw blocks, those having too few or too many pixels on or blocks that are too narrow to be considered valid character, can be removed, as indicated at blocks 465 and 470. Thereafter, as indicated at block 475, the location of maximum histogram value ($max_i$), and beginning ($b_i$), mid ($mid_i$), and end ($e_i$) endpoints for each of the remaining i revised blocks can be found and median spacing ($M_{space}$) between revised block midpoints can be measured, where $b_i$ represents the nearest location before $max_i$ for which $H<=T_{Hist}$, $e_i$ represents the nearest location after $max_i$ for which $H<=T_{hist}$, $mid_i$ is defined as $b_i+(e_i)/2$. The vertical character segmentation result after completion of block 470 is illustrated in FIG. 11. This set of cuts exhibits two common difficulties in segmentation. Initially, the numbers 3 and 5 can be combined due to the artifact at the bottom of the bounding box image. Second, the special character in the center of the plate is omitted by the binarization process. Another common problem, not shown in this example, is overlap between binarized characters, which often results from residual rotation or shear of the characters after preprocessing of the license plate image.

Figure 12:
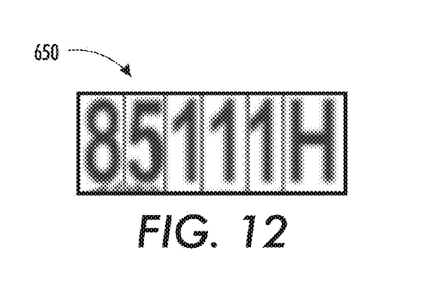

The wide blocks (those for which $mid_{i+1}-mid_i>(1+gap\ factor)*M_{space}$ and $b_{i+1}-e_i<gap\ factor$) can be split and the gaps between blocks can be converted into eligible blocks (those for which $mid_{i+1}-mid_i>(1+gap\ factor)*M_{space}$ and $b_{+1}-e_i>=gap\ factor$), as depicted at blocks 480 and 485. The validity of characters can be checked and flagged if suspect, as indicated at block 490 and character segmentation result is illustrated in FIG. 11. The wide cut can be detected and corrected by the blocks 475 and 480. This is illustrated in FIG. 12.

Figure 13:
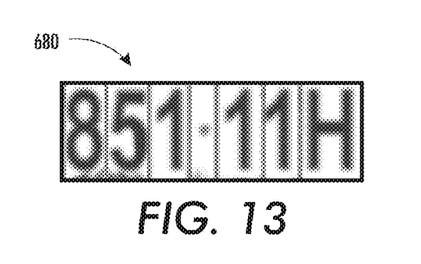

The single, wide cut can be split into two by placing a boundary at the minimum histogram value in the region near the center of the wide cut. In block 485, gaps between blocks can be converted into eligible blocks filled with the missing image data. The output of character segmentation after block 485 is depicted in FIG. 13. Finally, as depicted in block 490, an image-based classifier, which has been trained to identify the presence (or absence) of a valid letter or number is applied to each of the segmented cuts. For example, the result of this operation is that the cut containing the special character (the logo near the center of the plate) is classified as suspicious. Ragging symbols and logos in this fashion is critical to ensure high accuracy of the subsequent character recognition step.

Figure 14:
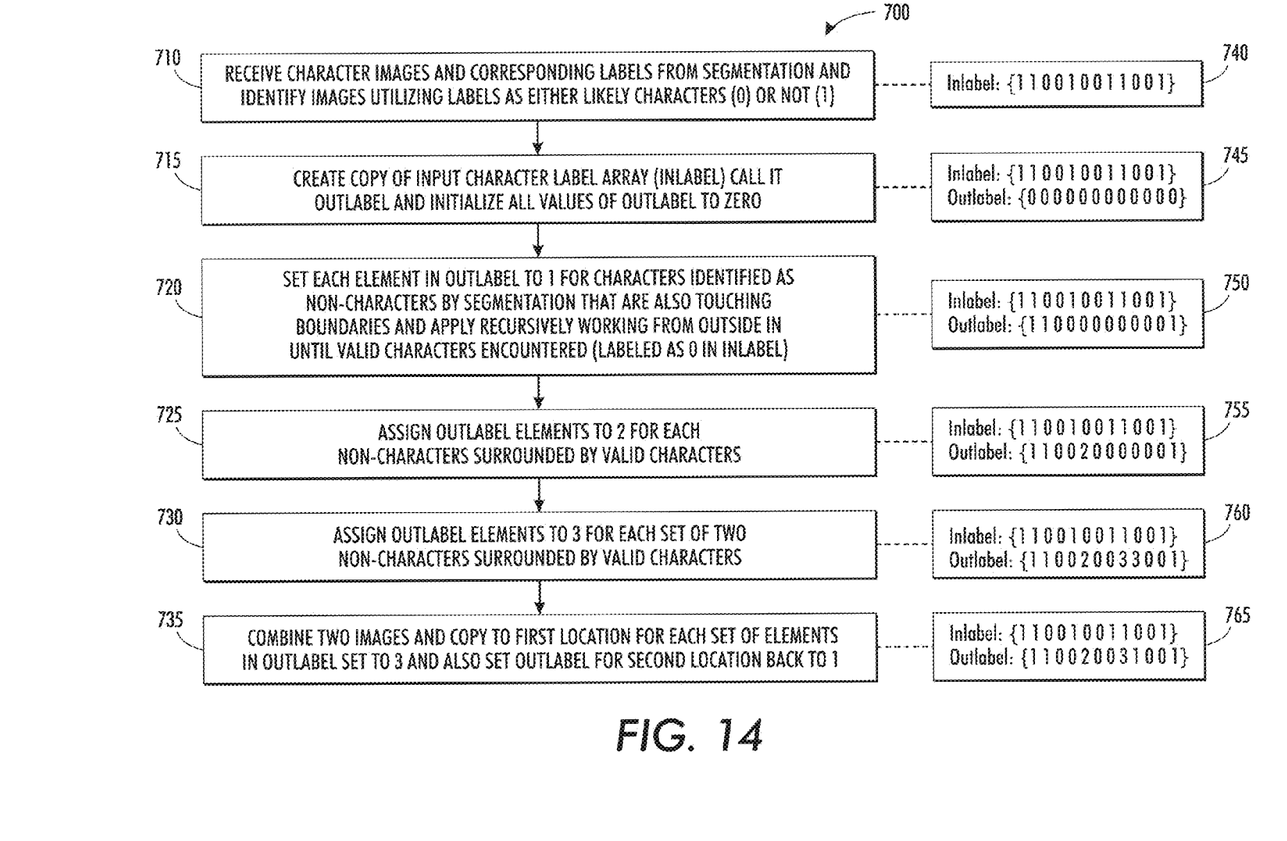
FIG. 14 illustrates a high level flow chart of operations illustrating logical operational steps of a method for labeling of review candidates, in accordance with the disclosed embodiments.

FIG. 14 illustrates a high level flow chart of operations illustrating logical operational steps of a method 700 for labeling of review candidates, in accordance with the disclosed embodiments. The character segmentation module returns bitmaps of segmented images along with labels identifying which of the bitmaps are likely valid character images. By enforcing the confidence threshold, it is possible to reject non-character images at the OCR level. Even with a high confidence, OCR errors are possible but less likely.

The method 700 covers three typical segmentation failures such as, for example, valid character image is split in half (common for U, H, M, W) and both halves are flagged as non-characters. This causes a valid character to be dropped from the plate code creating an error. The valid character image is split in half (common for U, H, M, W) and one half is flagged as non-character while the other is identified as a valid character. This leads to a single character OCR error (common for U becoming J or L). The valid character image is labeled as a non-character by segmentation that leads to a dropped character error in the plate code.

The character images and corresponding labels from segmentation can be received and images can be identified utilizing labels as either likely characters (0) or not (1), as indicated at blocks 710 and 740. A copy of input character label array (inlabel) can be created and the copy can be called as outlabel and all values of outlabel can be initialized to zero, as shown at blocks 715 and 745. Thereafter, as illustrated at block 720 and 750, each element in outlabel can be set to 1 for characters identified as non-characters by segmentation that are also touching boundaries and this can be applied recursively working from outside in until valid characters encountered (labeled as 0 in inlabel). The outlabel elements can be assigned to 2 for each non-characters surrounded by valid characters, as depicted at blocks 725 and 755. The outlabel elements then can be assigned to 3 for each set of two non-characters surrounded by valid characters, as illustrated at blocks 730 and 760.

Figure 15:
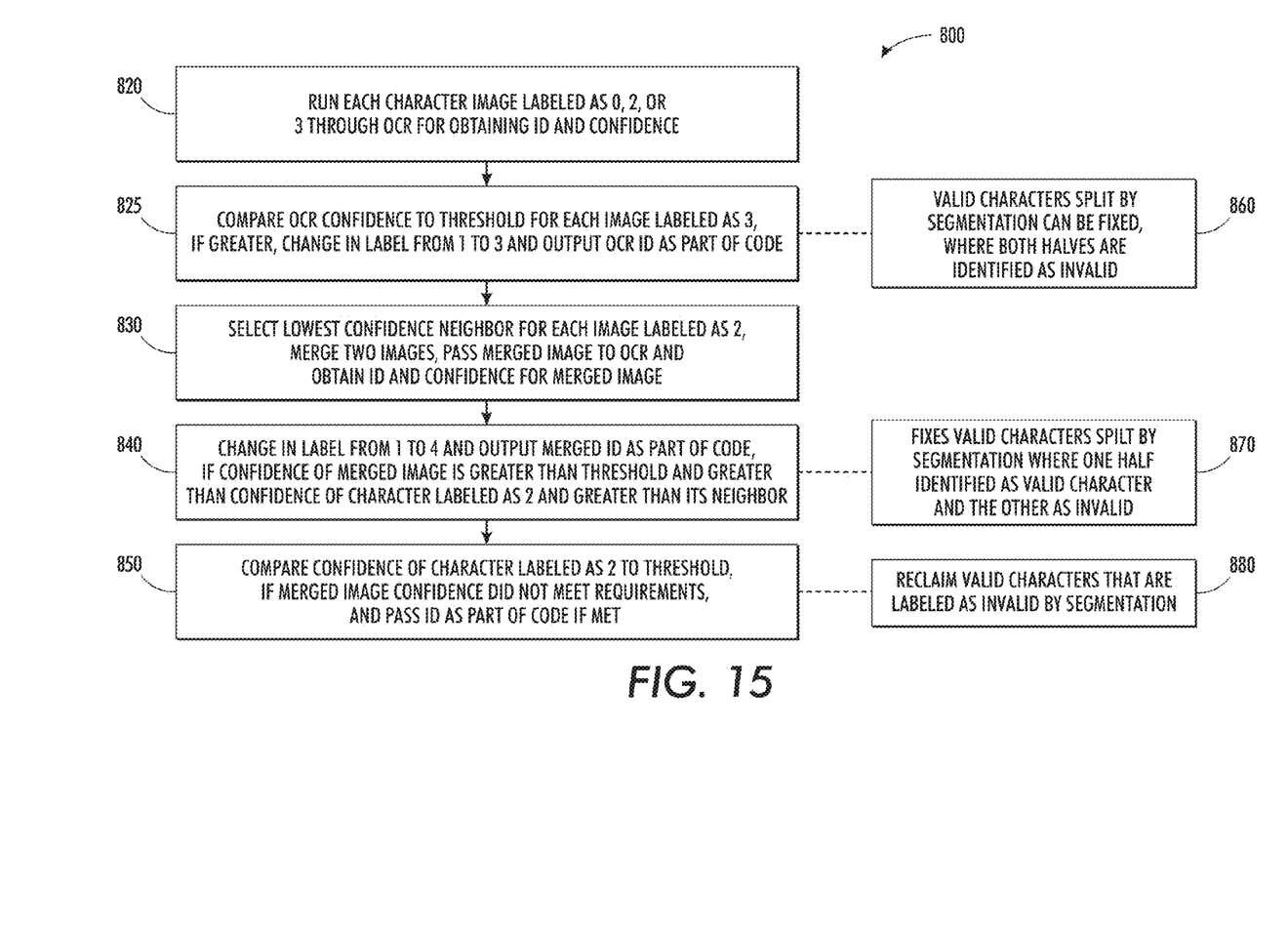
FIG. 15 illustrates a high level flow chart of operations illustrating logical operational steps of a method for processing of recovering segmentation errors, in accordance with the disclosed embodiments.

The two images can be combined and copy to first location for each set of elements in outlabel set to 3 and also set outlabel for second location back to 1, as indicated at blocks 735 and 765. The three errors can be identified and the logic associated with this step is illustrated in FIG. 14. FIG. 15 outlines the process employed to address each of the three error cases. The OCR confidence can be selected and enforced as part of the character reclaiming process ensuring that the segmentation label is overridden only for cases with high confidence. The license plate segmentation module 152 provides a net benefit while minimizing errors and false alarms. The net benefit is quantified on a system level as shown in FIG. 16.

FIG. 15 illustrates a high level flow chart of operations illustrating logical operational steps of a method 800 for processing of recovering segmentation errors, in accordance with the disclosed embodiments. Each character image labeled as 0, 2, or 3 can be run through OCR for obtaining ID and confidence, as shown at block 820. The OCR confidence can be compared to threshold for each image labeled as 3, if greater, change in label from 1 to 3 and output OCR ID as part of code, as indicated at blocks 825.

The lowest confidence neighbor for each image labeled as 2 can be selected, two images can be merged and passed to OCR to obtain ID and confidence for merged image, as depicted at block 830. Thereafter, as shown at block 840, the label from 1 to 4 can be changed and an output merged ID as part of the code, if the confidence of the merged image is greater than a particular threshold and greater than the confidence of the character labeled as 2 and further greater than its neighbor. The confidence of character labeled as 2 to threshold can be compared if merged image confidence does not meet requirements and pass ID as part of code if met, as indicated at blocks 850. Note that as depicted at block 860 and with respect to the action described at block 825, valid characters split by segmentation can be fixed, where both halves are identified as invalid. As indicated at block 870 with respect to the action shown at block 840, valid characters split by segmentation can be fixed, where one half is identified as a valid character and the other half is identified as invalid. Finally, as shown at block 880 with respect to the action indicated at block 850, valid characters that are labeled as invalid by segmentation can be reclaimed.

Figure 16:
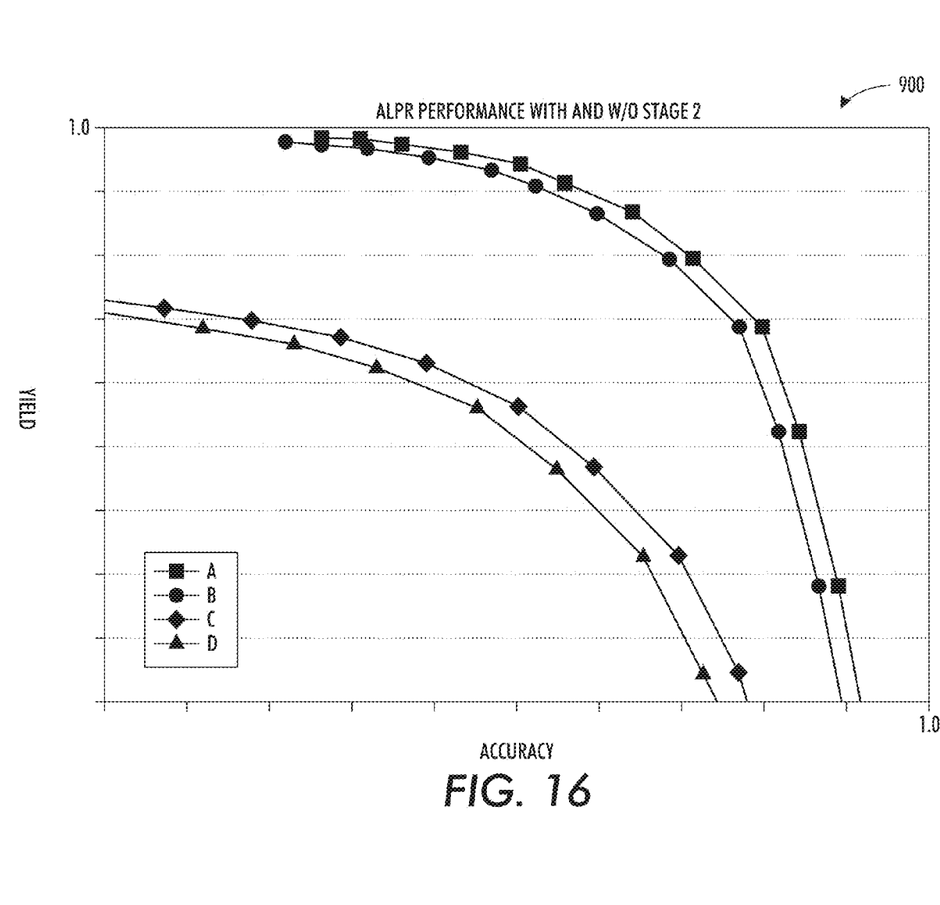
FIG. 16 illustrates a graph depicting an ALPR system performance with and without stage two processing, in accordance with the disclosed embodiments.

FIG. 16 illustrates a graph 900 depicting the ALPR system 200 performance with and without stage two processing, in accordance with the disclosed embodiments. The performance of the ALPR system 200 on 30 k single vehicle images bearing, for example, California license plates. Four yield and accuracy plots are shown, two for the performance on a transaction level where two or more images are employed as part of the conclusion (i.e., front and rear plate for the same vehicle passing through the toll plaza) and two on an image level where a conclusion is made for each image independently. The plots (C and respectively) are the image level results and the other two (A and B respectively) are for the transaction level. For a fixed yield of 80% (conclusion provided on 80% of images/transactions), accuracy improves 0.7% on an image level and 0.25% on transaction level.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A license plate character segmentation method, said method comprising:
   determining an initial character boundary of a vehicle image utilizing a midpoint of a segment along a vertical projection histogram in order to partition said initial character boundary from said vehicle image;
   classifying said initial character boundary as a valid character boundary or a suspect character boundary;
   analyzing said suspect character boundary and enabling robust performance over a plurality of state logos, fonts, and character spacing;
   receiving a character image and a label and identifying said character image utilizing said label as a likely character or not;
   creating a copy of an input character label array as outlabel and initializing all values of said outlabel to zero;
   setting each element in said outlabel to one for a character identified as a non-character that is touching a boundary until a valid character is encountered;
   assigning said outlabel element to two for each non-character surrounded by said valid character;
   setting said outlabel element to three for each set of at least two non-characters surrounded by said valid character and combining at least two images and copying to a first location for each set of element in said outlabel set to three and also set outlabel for second location back to one; and
   normalizing and passing said suspect character boundary to an optical character recognition subsystem for decoding and generating a confidence quote for each suspect character boundary of said vehicle image analyzed and thereafter modifying each suspect character boundary decoded based on a set of confidence thresholds.

2. The method of claim 1 wherein said modification of each suspect character boundary comprises rejecting a non-character image by enforcing a confidence threshold of said set of confidence thresholds.

3. The method of claim 1 wherein said modification of each suspect character boundary comprises accepting a non-character image by enforcing a confidence threshold of said set of confidence thresholds.

4. The method of claim 1 wherein said modification of each suspect character boundary comprises combining an adjoining suspect narrow character with said each suspect character boundary to create a combined character and assessing said optical character recognition confidence of said combined character to achieve enhanced character segmentation accuracy.

5. The method of claim 1 further comprising:
   splitting a single, wide initial character boundary into two by placing a boundary at a minimum histogram value in a region near a center of said wide initial character boundary; and
   replacing a large gap caused by omission of a special character with a missing image data.

6. The method of claim 1 further comprising training an image-based classifier to identify presence of a valid letter and/or a number and applying said image-based classifier to each segment of said initial character boundary.

7. The method of claim 1 further comprising identifying and addressing at least one segmentation error.

8. The method of claim 7 wherein addressing said at least one segmentation error further comprises:
   obtaining an optical character recognition identification and said confidence quote by running each character image labeled as zero, two, and three;
   comparing said confidence quote to said threshold for each character image labeled as three, if greater, change from one to three and output said optical character recognition identification as part of a computer code; and
   selecting a lowest confidence neighbor for each character image labeled as two, merging two character images and passing to said optical character recognition subsystem to obtain said optical character recognition identification and said confidence quote for said two character images merged.

9. The method of claim 8 further comprising:
   changing said label from one to four and output merged identification as part of said computer code if said confidence quote of said merged image is greater than said threshold and greater than said confidence quote of said character labeled as two and greater than its neighbor; and
   comparing said confidence of said character labeled as two to said threshold if said merged image confidence does not meet a requirement otherwise passing said identification as part of said computer code.

10. The method of claim 1 wherein said segmentation method returns a bitmap of a segmented image along with a label identifying said bitmap that is likely a valid character image.

11. A license plate character segmentation system, said system comprising:
   a processor;
   a data bus coupled to said processor; and
   a computer-usable medium embodying computer code, said computer-usable medium being coupled to said data bus, said computer code comprising instructions executable by said processor and configured for:
   determining an initial character boundary of a vehicle image utilizing a midpoint of a segment along a vertical projection histogram in order to partition said initial character boundary from said vehicle image;
   classifying said initial character boundary cut as a valid character boundary or a suspect character boundary;
   analyzing said suspect character boundary and enabling robust performance over a plurality of state logos, fonts, and character spacing;

receiving a character image and a label and identifying said character image utilizing said label as a likely character or not;

creating a copy of an input character label array as outlabel and initializing all values of said outlabel to zero;

setting each element in said outlabel to one for a character identified as a non-character that is touching a boundary until a valid character is encountered;

assigning said outlabel element to two for each non-character surrounded by said valid character;

setting said outlabel element to three for each set of at least two non-characters surrounded by said valid character and combining at least two images and copying to a first location for each set of element in said outlabel set to three and also set outlabel for second location back to one; and normalizing and passing said suspect character boundary to an optical character recognition subsystem for decoding and generating a confidence quote for each suspect character boundary of said vehicle image analyzed and thereafter modifying each suspect character boundary decoded based on a set of confidence thresholds.

12. The system of claim 11 wherein said modification of each suspect character boundary comprises rejecting a non-character image by enforcing a confidence threshold of said set of confidence thresholds.

13. The system of claim 11 wherein said modification of each suspect character boundary comprises accepting a non-character image by enforcing a confidence threshold of said set of confidence thresholds.

14. The system of claim 11 wherein said modification of each suspect character boundary comprises combining an adjoining suspect narrow character with said each suspect character boundary to create a combined character and assessing said optical character recognition confidence of said combined character to achieve enhanced character segmentation accuracy.

15. A non-transitory processor-readable medium storing code representing instructions to cause a process to perform a process of license plate character segmentation, said code comprising code to:

determine an initial character boundary of a vehicle image utilizing a midpoint of a segment along a vertical projection histogram in order to partition said initial character boundary from said vehicle image;

classify said initial character boundary as a valid character boundary or a suspect character boundary;

analyze said suspect character and enable robust performance over a plurality of state logos, fonts, and character spacing;

receive a character image and a label and identifying said character image utilizing said label as a likely character or not;

create a copy of an input character label array as outlabel and initializing all values of said outlabel to zero;

set each element in said outlabel to one for a character identified as a non-character that is touching a boundary until a valid character is encountered;

assign said outlabel element to two for each non-character surrounded by said valid character;

set said outlabel element to three for each set of at least two non-characters surrounded by said valid character and combining at least two images and copying to a first location for each set of element in said outlabel set to three and also set outlabel for second location back to one; and normalize and pass said suspect character boundary to an optical character recognition subsystem for decoding and generating a confidence quote for each suspect character boundary of said vehicle image analyzed and thereafter modifying each suspect character boundary decoded based on a set of confidence thresholds.

\* \* \* \* \*